(12) United States Patent
Sakihara

(10) Patent No.: US 10,655,677 B2
(45) Date of Patent: May 19, 2020

(54) TRIPOD CONSTANT VELOCITY UNIVERSAL JOINT AND METHOD FOR MANUFACTURING SAME

(71) Applicant: NTN CORPORATION, Osaka (JP)

(72) Inventor: Ritsuki Sakihara, Shizuoka (JP)

(73) Assignee: NTN CORPORATION, Osaka (JP)

( * ) Notice: Subject to any disclaimer, the term of this patent is extended or adjusted under 35 U.S.C. 154(b) by 534 days.

(21) Appl. No.: 15/326,704

(22) PCT Filed: Jun. 30, 2015

(86) PCT No.: PCT/JP2015/068807
§ 371 (c)(1),
(2) Date: Jan. 17, 2017

(87) PCT Pub. No.: WO2016/017345
PCT Pub. Date: Feb. 4, 2016

(65) Prior Publication Data
US 2018/0335076 A1 Nov. 22, 2018

(30) Foreign Application Priority Data
Jul. 30, 2014 (JP) ................. 2014-154978

(51) Int. Cl.
*F16C 33/64* (2006.01)
*F16D 3/205* (2006.01)
(Continued)

(52) U.S. Cl.
CPC ............... *F16C 33/64* (2013.01); *C21D 6/00* (2013.01); *C21D 9/38* (2013.01); *C21D 9/40* (2013.01);
(Continued)

(58) Field of Classification Search
CPC ........ F16C 33/64; F16C 13/006; F16C 23/08; F16C 19/466; C21D 9/38; C21D 9/40;
(Continued)

(56) References Cited

U.S. PATENT DOCUMENTS 6,390,924 B1 * 5/2002 Yoshida ................. F16D 3/2055
464/111
9,086,100 B2 * 7/2015 Kim ........................ F16D 3/205
(Continued)

FOREIGN PATENT DOCUMENTS

EP 1 484 521 12/2004
JP 53-33084 3/1978
(Continued)

OTHER PUBLICATIONS

Extended European Search Report dated Mar. 22, 2018 in corresponding European Patent Application No. 15827592.5.
(Continued)

*Primary Examiner* — Greg Binda
(74) *Attorney, Agent, or Firm* — Wenderoth, Lind & Ponack, L.L.P.

(57) ABSTRACT

Provided is a tripod type constant velocity universal joint (1), including: an outer joint member (2) having track grooves (6) formed at trisected positions in a circumferential direction to extend in an axial direction; a tripod member (3) including leg shafts (9) radially projecting from trisected positions in the circumferential direction; and rollers (4) fitted in a freely rotatable manner about the leg shafts (9), respectively, and received in the track grooves (6), respectively, in which a radially outer surface (4*a*) of each of the rollers (4) is formed of a surface unsubjected to grinding or cutting work after heat treatment.

3 Claims, 9 Drawing Sheets

(51) Int. Cl.
*C21D 6/00* (2006.01)
*F16C 13/00* (2006.01)
*C21D 9/38* (2006.01)
*C21D 9/40* (2006.01)
*F16C 19/46* (2006.01)
*F16C 23/08* (2006.01)
*F16D 3/202* (2006.01)
*F16C 29/04* (2006.01)

(52) U.S. Cl.
CPC .......... *F16C 13/006* (2013.01); *F16D 3/2055* (2013.01); *F16C 19/466* (2013.01); *F16C 23/08* (2013.01); *F16C 29/045* (2013.01); *F16D 2003/2026* (2013.01); *F16D 2250/0038* (2013.01); *F16D 2250/0053* (2013.01); *F16D 2300/10* (2013.01); *Y10S 464/905* (2013.01)

(58) Field of Classification Search
CPC . C21D 6/00; F16D 3/2055; F16D 2250/0053; F16D 2250/0038; F16D 2300/10; Y10S 464/905
USPC ........................................................ 464/111
See application file for complete search history.

(56) References Cited

U.S. PATENT DOCUMENTS

| | | |
|---|---|---|
| 2002/0110301 A1 | 8/2002 | Niina |
| 2002/0112518 A1 | 8/2002 | Sannomiya |
| 2002/0119894 A1 | 8/2002 | Yoshida |
| 2004/0248657 A1 | 12/2004 | Murakami et al. |

FOREIGN PATENT DOCUMENTS

| | | | | |
|---|---|---|---|---|
| JP | 01-222801 | 9/1989 | | |
| JP | 6-249317 | 9/1994 | | |
| JP | 2000-81050 | 3/2000 | | |
| JP | 2001-54912 | 2/2001 | | |
| JP | 2001-300675 | 10/2001 | | |
| JP | 2002-213477 | 7/2002 | | |
| JP | 2002-235753 | 8/2002 | | |
| JP | 2004-100754 | 4/2004 | | |
| JP | 2005-147270 A | * 6/2005 | ........... | F16D 3/2055 |
| JP | 2007-40503 | 2/2007 | | |
| JP | 3947342 | 7/2007 | | |
| JP | 2008-275095 | 11/2008 | | |
| WO | 2007/148487 | 12/2007 | | |

OTHER PUBLICATIONS

Notice of reasons for refusal dated Mar. 8, 2018 in Japanese Patent Application No. 2014-154978, with English-language translation.
International Search Report dated Sep. 29, 2015 in International (PCT) Application No. PCT/JP2015/068807.
English translation of International Preliminary Report on Patentability and Written Opinion of the International Searching Authority dated Jan. 31, 2017 in corresponding International (PCT) Application No. PCT/JP2015/068807.

* cited by examiner

TRIPOD CONSTANT VELOCITY UNIVERSAL JOINT AND METHOD FOR MANUFACTURING SAME

TECHNICAL FIELD

The present invention relates to a plunging tripod type constant velocity universal joint to be used for power transmission in automobiles, industrial machines, and the like, and a method of manufacturing the plunging tripod type constant velocity universal joint.

BACKGROUND ART

As illustrated in FIG. 7a and FIG. 7b, a tripod type constant velocity universal joint 51 includes an outer joint member 52, a tripod member 60, and rollers 70. The outer joint member 52 has three track grooves 53 formed at trisected positions in a circumferential direction to extend in an axial direction, and roller guide surfaces 54 formed on side walls to the track grooves 53. The tripod member 60 includes trunnion journals 62 radially projecting from trisected positions on a trunnion barrel 61 in the circumferential direction. The rollers 70 are each fitted in a freely rotatable manner about each trunnion journal 62 through intermediation of a plurality of needle rollers 72. The rollers 70 are received in the track grooves 53 of the outer joint member 52. Each roller 70 has an outer spherical surface 70a. The outer spherical surface 70a is guided by the roller guide surfaces 54 formed on both the side walls of each track groove 53 (see Patent Document 1).

PRIOR ART DOCUMENTS

Patent Documents

Patent Document: JP 3947342 A

SUMMARY OF THE INVENTION

Problems to be Solved by the Invention

When the tripod type constant velocity universal joint 51 transmits a rotational force under a state in which the joint forms an operating angle θ as illustrated in FIG. 8a, the roller 70 and each roller guide surface 54 are in a mutually oblique relationship as illustrated in FIG. 8b. The roller guide surfaces 54 of each track groove 53 are parts of a cylindrical surface parallel to an axis of the outer joint member 52. Thus, the roller 70 is moved while being restrained within the roller guide surfaces 54 of the track groove 53. As a result, slippage occurs between the roller guide surfaces 54 and the roller 70. The slippage causes abrasion on the roller guide surfaces 54. Excessive progress of the abrasion causes vibration of a vehicle body and noises. In order to reduce the abrasion, the spherical radially outer surface 70a of the roller 70 is subjected to grinding, and then subjected to barrel finishing.

Accordingly, as illustrated in FIG. 9a to FIG. 9e, the roller 70 has a simple shape, but is completed through a large number of processing steps. Specifically, the roller 70 is formed into a ring shape through forging as illustrated in FIG. 9a, and then a radially inner surface, a radially outer surface, and chamfers are formed through turning as illustrated in FIG. 9b. After that, quenching and tempering are performed through heat treatment as illustrated in FIG. 9c. After the heat treatment, the radially outer surface and the radially inner surface are finished through grinding as illustrated in FIG. 9d. Finally, tumbling is performed as illustrated in FIG. 9e. Thus, the large number of processing steps increase manufacturing cost and a time period necessary for manufacture. With regard to the present invention, a focus has been made on the above-mentioned problem.

The present invention has been made in view of the above-mentioned problem, and has an object to provide a tripod type constant velocity universal joint and a method of manufacturing the tripod type constant velocity universal joint, which are capable of reducing manufacturing cost and increasing productivity while maintaining the same function of a roller as that of the roller manufactured by the related-art processing method.

Solutions to the Problems

In order to achieve the above-mentioned object, as a result of diligently conducting study and verification with a focus on the following multifaceted items, the inventors of the present invention have conceived a new concept of simplifying processing steps while maintaining the same function of a roller as that of the roller manufactured by the related-art processing method, and have made the present invention.

(1) Analysis of processing steps and possibility of simplification (2) Synergistic effect of turning and tumbling (3) Degree of influence on joint function by deformation due to heat treatment As a technical measure to achieve the above-mentioned object, according to one embodiment of the present invention, there is provided a tripod type constant velocity universal joint, comprising: an outer joint member having track grooves formed at trisected positions on the outer joint member in a circumferential direction of the tripod type constant velocity universal joint to extend in an axial direction thereof; a tripod member comprising leg shafts radially projecting from trisected positions on the tripod member in the circumferential direction; and rollers fitted in a freely rotatable manner about the leg shafts, respectively, and received in the track grooves, respectively, wherein a radially outer surface of each of the rollers is formed of a surface unsubjected to grinding or cutting work after subjecting to heat treatment.

Further, according to one embodiment of the present invention for a manufacturing method, there is provided a method of manufacturing a tripod type constant velocity universal joint, the tripod type constant velocity universal joint comprising: an outer joint member having track grooves formed at trisected positions on the outer joint member in a circumferential direction of the tripod type constant velocity universal joint to extend in an axial direction thereof; a tripod member comprising leg shafts radially projecting from trisected positions on the tripod member in the circumferential direction; and rollers fitted in a freely rotatable manner about the leg shafts, respectively, and received in the track grooves, respectively, the method comprising steps of manufacturing the rollers, which are performed without a step of grinding a radially outer surface of each of the rollers after subjecting the rollers to heat treatment, and comprise: a step of turning the radially outer surface of each of the rollers through use of a formed turning tool; a step of subjecting each of the rollers to heat treatment after the turning; and a step of tumbling each of the rollers after subjecting to the heat treatment.

With the above-mentioned configuration, there can be achieved the tripod type constant velocity universal joint and the method of manufacturing the tripod type constant velocity universal joint, which are capable of reducing manufacturing cost and increasing productivity while maintaining the same function of the roller as that of the roller manufactured by the related-art processing method. In Specification and Claims of the present application, grinding refers to a processing method of removing a surface of an object to be processed little by little through use of a whetstone, and excludes barrel finishing, tumbling, and the like which involves placing an object to be processed, a medium, an abrasive, and the like in a container and rotating or vibrating the container to polish the object to be processed. The cutting work refers to a processing method of shaving off an object to be processed through use of a bladed cutting tool such as a bit or an end mill.

Specifically, prior to the heat treatment, the radially outer surface of each of the rollers is formed of a turned surface having no lead mark. Thus, a spherical radially outer surface of a finished product finished by tumbling after heat treatment can have the surface roughness equal to that of the related-art product subjected to grinding.

It is preferred that the radially outer surface of each of the rollers have a circularity of 10 μm or more and 40 μm or less, more preferably 10 μm or more and 30 μm or less. Thus, the same function of the roller as that of the roller manufactured by the related-art processing method can be maintained. When the circularity of the radially outer surface of the roller exceeds 40 μm, slippage, which occurs between the radially outer surface of the roller and the roller guide surfaces, adversely affects a lifetime and durability. Meanwhile, reduction of the circularity to 10 μm or less causes increase in cost for heat treatment, which is not preferred.

It is preferred that the tripod type constant velocity universal joint be of a single roller type in which rollers are each fitted in a freely rotatable manner about a cylindrical outer peripheral surface of each of trunnion journals, which serve as leg shafts of a tripod member, through intermediation of a plurality of needle rollers. Thus, the tripod type constant velocity universal joint can be achieved at lower cost.

It is preferred that a step of tumbling each of the rollers be performed after the step of subjecting each of the rollers to heat treatment. Thus, surface roughness of the radially outer surface of each of the rollers can be set equal to that of the related-art product, and scales generated by the heat treatment can be removed.

It is preferred that a step of grinding a radially inner surface of each of the rollers be performed after the step of subjecting each of the rollers to heat treatment. Thus, deformation due to the heat treatment can be eliminated, and a rolling lifetime can be increased.

Effects of the Invention

According to the tripod type constant velocity universal joint and the method of manufacturing the tripod type constant velocity universal joint of the present invention, it is possible to achieve the tripod type constant velocity universal joint and the method of manufacturing the tripod type constant velocity universal joint, which are capable of reducing manufacturing cost and increasing productivity while maintaining the same function of the roller as that of the roller manufactured by the related-art processing method.

BRIEF DESCRIPTION OF DRAWINGS

FIG. 8b is a perspective view for illustrating states of a roller and a roller guide surface illustrated in FIG. 8a.

EMBODIMENTS OF THE INVENTION

A tripod type constant velocity universal joint according to an embodiment of the present invention, and a method of manufacturing the tripod type constant velocity universal joint according to the embodiment are described with reference to FIG. 1 to FIG. 6.

Figure 1A:
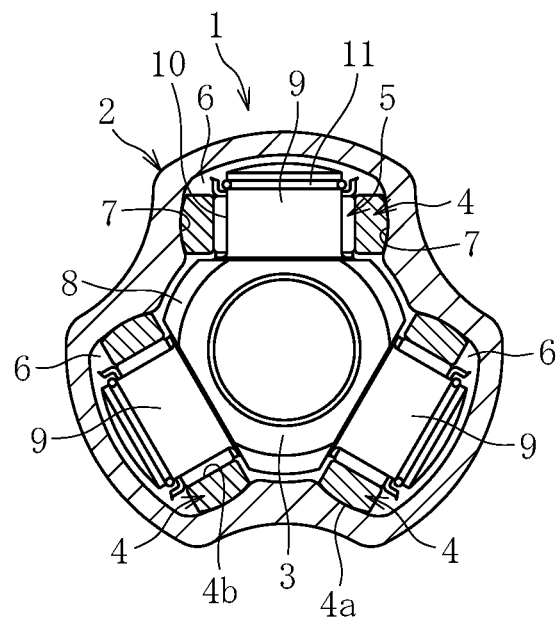
FIG. 1a is a lateral sectional view for illustrating a tripod type constant velocity universal joint according to an embodiment of the present invention.
Figure 1B:
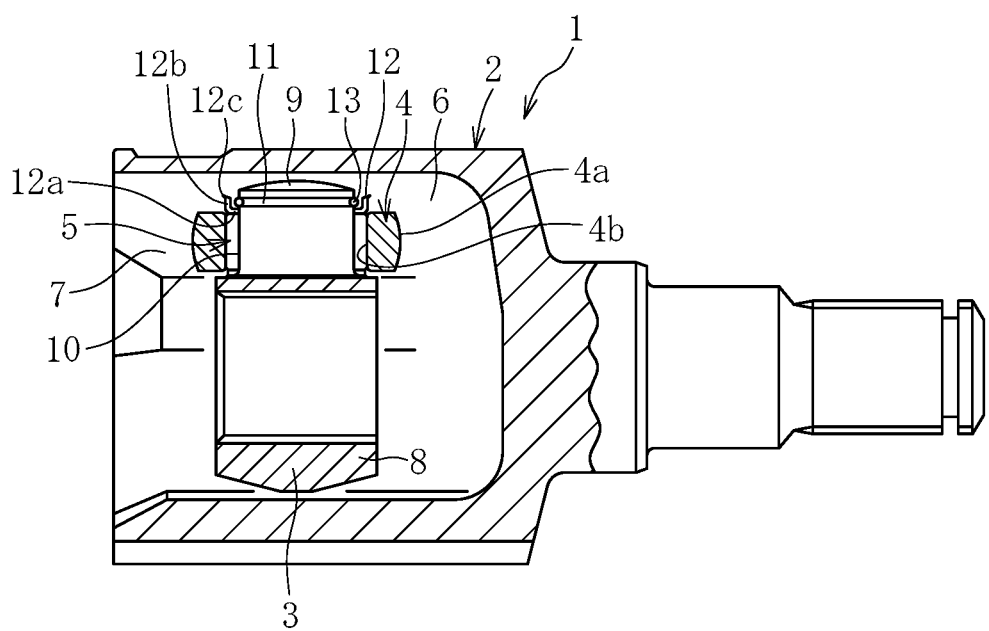
FIG. 1b is a longitudinal sectional view for illustrating the tripod type constant velocity universal joint according to the embodiment of the present invention.

FIG. 1a is a lateral sectional view for illustrating a tripod type constant velocity universal joint according to the embodiment of the present invention. FIG. 1b is a longitudinal sectional view for illustrating the tripod type constant velocity universal joint according to the embodiment of the present invention. As illustrated in FIG. 1a and FIG. 1b, a tripod type constant velocity universal joint 1 according to this embodiment mainly comprises an outer joint member 2, a tripod member 3 serving as an inner joint member, spherical rollers 4, and needle rollers 5 serving as rolling elements. The outer joint member 2 has a hollow cup shape with three track grooves 6 formed on an inner circumference thereof at trisected positions in a circumferential direction to extend in an axial direction. Roller guide surfaces 7 are formed on side walls opposed to the track grooves 6. The roller guide surfaces 7 are formed as parts of a cylindrical surface, that is, as partially cylindrical surfaces. A spherical radially outer surface 4a of each spherical roller 4 is guided on the roller guide surfaces 7 each having the above-mentioned shape.

The tripod member 3 comprises a trunnion barrel 8 and trunnion journals 9 serving as leg shafts. Three trunnion journals 9 are formed to radially project from trisected positions on the trunnion barrel 8 in the circumferential direction. Each trunnion journal 9 has a cylindrical outer peripheral surface 10 and an annular retaining ring groove 11 formed in the vicinity of a shaft end of the trunnion journal 9. The spherical roller 4 is fitted in a freely rotatable manner about the cylindrical outer peripheral surface 10 of the trunnion journal 9 through intermediation of the plurality of needle rollers 5. The cylindrical outer peripheral surface 10 of the trunnion journal 9 serves as an inner raceway surface of the needle rollers 5. An inner peripheral surface 4b of the spherical roller 4 has a cylindrical shape and serves as an outer raceway surface of the needle rollers 5.

In the retaining ring groove 11 formed in the vicinity of the shaft end of the trunnion journal 9, a retaining ring 13 is fitted through intermediation of an outer washer 12. Movement of the needle rollers 5 in an axial direction of the trunnion journal 9 is restricted by a root step portion of the trunnion journal 9 and the outer washer 12. The outer washer 12 comprises a disc portion 12a extending in a radial direction of the trunnion journal 9, and a cylindrical portion 12b extending in the axial direction of the trunnion journal 9. The cylindrical portion 12b of the outer washer 12 has an outer diameter that is smaller than a diameter of the inner peripheral surface 4b of the spherical roller 4, and an end portion 12c of the cylindrical portion 12b, which is located on an outer side when viewed in a radial direction of the tripod member 3, is formed to have a diameter that is larger than that of the inner peripheral surface 4b of the spherical roller 4. Thus, the spherical roller 4 is movable in the axial direction of the trunnion journal 9, and is prevented from dropping off by the end portion 12c.

The spherical roller 4 fitted on the trunnion journal 9 of the tripod member 3 in a freely rotatable manner is guided by the roller guide surfaces 7 of the track groove 6 of the outer joint member 2 in a freely rotatable manner. With this structure, relative axial displacement and relative angular displacement between the outer joint member 2 and the tripod member 3 are absorbed so that the rotation is transmitted at constant velocity.

Figure 8A:
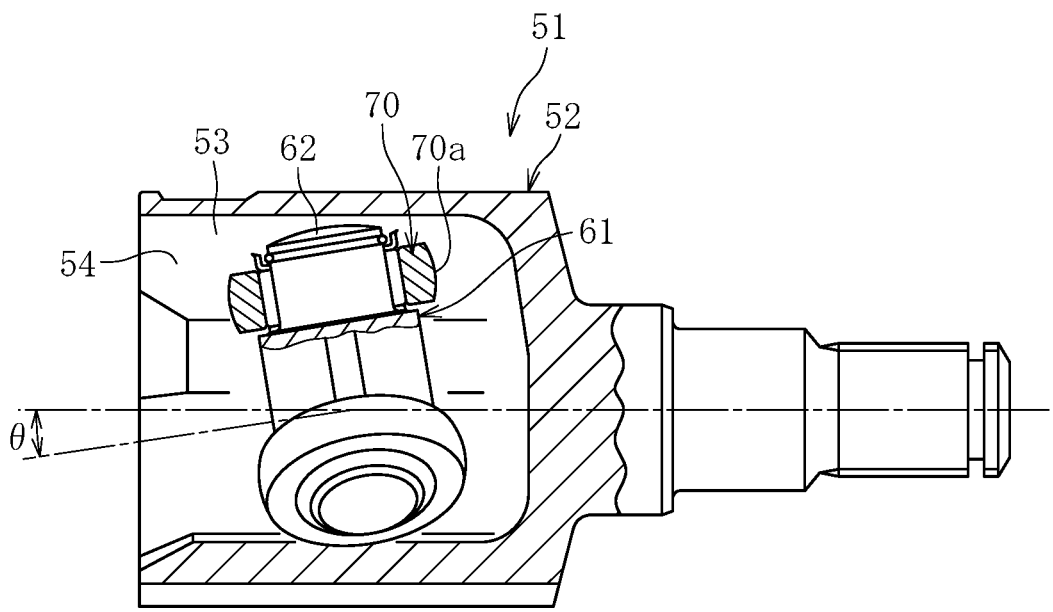
FIG. 8a is a partial longitudinal sectional view for illustrating a state in which the tripod type constant velocity universal joint illustrated in FIG. 7a and FIG. 7b forms an operating angle.
Figure 8B:
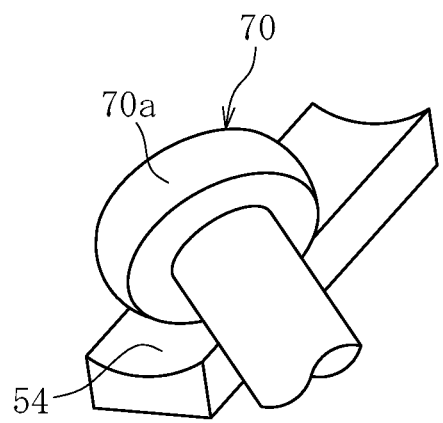
Figure 9A:
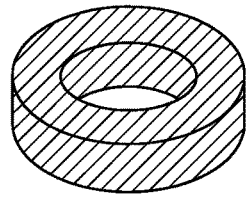
FIG. 9a is a schematic view for illustrating forging among related-art steps of manufacturing a roller of a tripod type constant velocity universal joint.
Figure 9B:
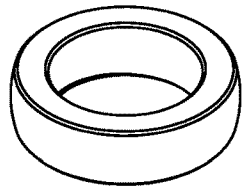
FIG. 9b is a schematic view for illustrating turning among the related-art steps of manufacturing the roller of the tripod type constant velocity universal joint.
Figure 9C:
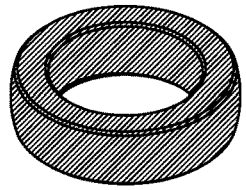
FIG. 9c is a schematic view for illustrating the heat treatment among the related-art steps of manufacturing the roller of the tripod type constant velocity universal joint.
Figure 9D:
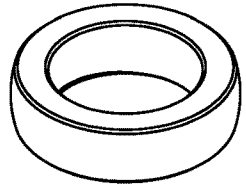
FIG. 9d is a schematic view for illustrating grinding among the related-art steps of manufacturing the roller of the tripod type constant velocity universal joint.
Figure 9E:
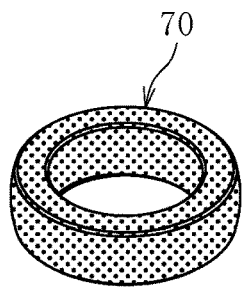
FIG. 9e is a schematic view for illustrating tumbling among the related-art steps of manufacturing the roller of the tripod type constant velocity universal joint.

When a rotational force is transmitted under a state in which the joint forms an operating angle, in the same manner as that illustrated in FIG. 8b, the spherical roller 4 and each roller guide surface 7 are in a mutually oblique relationship. Further, the roller guide surfaces 7 of each track groove 6 are the parts of the cylindrical surface parallel to an axis of the outer joint member 2. Thus, the spherical roller 4 is moved while being confined within the roller guide surfaces 7 of the track groove 6. As a result, slippage occurs between the roller guide surfaces 7 and the roller 4.

The spherical roller 4 and each roller guide surface 7 are generally brought into contact with each other in two ways, that is, angular contact and circular contact. In the angular contact, the spherical roller 4 and the roller guide surface 7 are brought into contact with each other at two points with a contact angle. In the circular contact, the spherical roller 4 and the roller guide surface 7 are brought into contact with each other at one point.

The characteristic configuration of the tripod type constant velocity universal joint according to this embodiment is that the spherical radially outer surface 4a of the spherical roller 4 is formed of a surface unsubjected to grinding or cutting work after subjecting to the heat treatment. Further, the characteristic configuration of the method of manufacturing the tripod type constant velocity universal joint according to the embodiment is that the method comprises steps of manufacturing the rollers, which are performed without a step of grinding the spherical radially outer surface 4a of each spherical roller 4, and which comprise a step of turning the spherical roller 4 through use of a formed turning tool, and a step of tumbling the spherical roller 4.

Figure 2A:
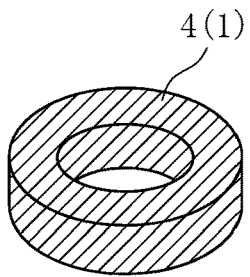
FIG. 2a is a schematic view for illustrating forging among steps of manufacturing a roller of the tripod type constant velocity universal joint illustrated in FIG. 1a and FIG. 1b.
Figure 2B:
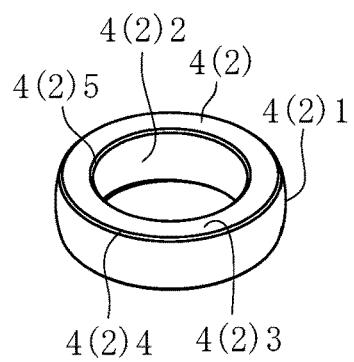
FIG. 2b is a schematic view for illustrating turning among the steps of manufacturing the roller of the tripod type constant velocity universal joint illustrated in FIG. 1a and FIG. 1b.
Figure 2C:
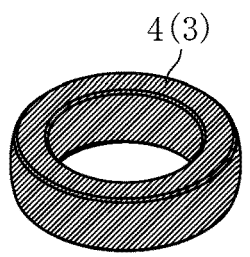
FIG. 2c is a schematic view for illustrating heat treatment among the steps of manufacturing the roller of the tripod type constant velocity universal joint illustrated in FIG. 1a and FIG. 1b.
Figure 2D:
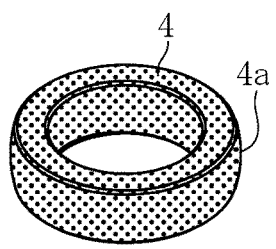
FIG. 2d is a schematic view for illustrating tumbling among the steps of manufacturing the roller of the tripod type constant velocity universal joint illustrated in FIG. 1a and FIG. 1b.

The steps of manufacturing the spherical roller 4 are described with reference to FIG. 2a to FIG. 2d. As illustrated in FIG. 2a, a casted and forged material 4(1) is formed through forging. As illustrated in FIG. 2b, a radially inner surface, a radially outer surface, end surfaces, and chamfers are formed by turning, thereby obtaining a turned product 4(2). After that, as illustrated in FIG. 2c, the turned product 4(2) is quenched and tempered through the heat treatment, thereby obtaining a heat-treated product 4(3). After the heat treatment, without performing finishing by grinding adopted in the related-art processing method, tumbling is performed as illustrated in FIG. 2d, thereby obtaining a finished product 4.

High-carbon chromium bearing steel is typically used as a material for the spherical roller 4. Further, through-hardening is performed as the heat treatment illustrated in FIG. 2c, and the through-hardened product has a hardness of from about HRC 58 to about HRC 61.

Tumbling is typically performed in order to remove burrs, scales, and the like. Tumbling is a polishing method which involves placing object to be tumbled and an abrasive in a container and rotating the container to polish the object to be tumbled with mutual abrasive actions. Through tumbling, surface roughness of the radially outer surface of the spherical roller 4 can be set equal to that of the related-art product, and scales generated by the heat treatment can be removed.

Additional description is made of the turning illustrated in FIG. 2b. On the casted and forged material 4(1) having the ring shape, which has been subjected to forging, illustrated in FIG. 2a, turning is performed to form a spherical radially outer surface 4(2)1, a radially inner surface 4(2)2, end surfaces 4(2)3, and chamfers 4(2)4 and 4(2)5 as illustrated in FIG. 2b. The spherical radially outer surface 4(2)1 is turned through use of a formed turning tool.

Figure 3A:
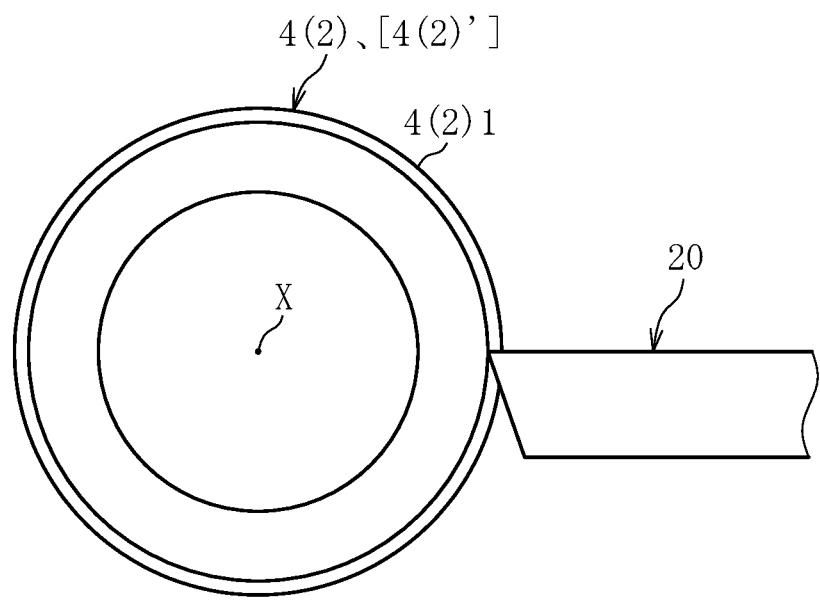
FIG. 3a is a schematic side view for illustrating a state in which a spherical radially outer surface of the roller illustrated in FIG. 2b is subjected to turning.
Figure 3B:
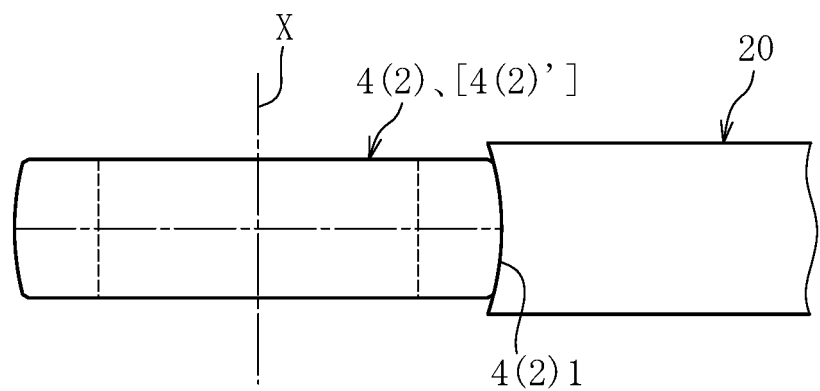
FIG. 3b is a schematic plan view for illustrating the state in which the spherical radially outer surface of the roller illustrated in FIG. 2b is subjected to turning.

FIG. 3a and FIG. 3b are illustrations of turning to be performed on the spherical radially outer surface 4(2)1 through use of the formed turning tool. FIG. 3a is a side view, and FIG. 3b is a plan view. The radially inner surface, the radially outer surface, the end surfaces, and the like of the casted and forged material 4(1) of the spherical roller illustrated in FIG. 2a are subjected to turning, thereby obtaining a cylindrical semifinished product 4(2)'. Under a state in which the semifinished product 4(2)' is chucked (not shown), a formed turning tool 20 is sent along a direction orthogonal to an axis X of the semifinished product 4(2)' to subject the spherical radially outer surface 4(2)1 to turning. Through the above-mentioned turning through use of the formed turning tool 20, the spherical radially outer surface 4(2)1 is formed into a turned surface having no lead mark. The spherical roller 4 of the tripod type constant velocity universal joint 1 according to this embodiment is unsubjected to grinding after the heat treatment. Accordingly, the turned surface of the spherical radially outer surface 4(2)1 is formed to have a dimension of a finished product having no grinding allowance.

With regard to the above-mentioned turning of the spherical radially outer surface 4(2)1 through use of the formed turning tool 20, the following unexpected advantages have been found. The turned product 4(2) is subjected to the tumbling illustrated in FIG. 2d after the heat treatment illustrated in FIG. 2c. It has been found out that surface roughness of the spherical radially outer surface 4a of the finished product 4 finished by the tumbling can be set to a level equal to that of the related-art product subjected to grinding. Thus, it has been possible to verify that satisfactory surface roughness of the spherical radially outer surface 4a is obtained due to synergism of the turning of the spherical radially outer surface 4(2)1 through use of the formed turning tool 20, and the tumbling performed as finishing. This is the key to analysis of processing steps and to ascertainment of a possibility of simplification.

Further, results of verification of the surface roughness of the spherical radially outer surface 4a offered motivation for an attempt to verify an influence of deformation due to heat treatment on joint function as the next step. The spherical roller 4 adopted in this embodiment is unsubjected to grinding after subjecting to the heat treatment. Thus, deformation due to the heat treatment remains as it is. Accordingly, a state of a circularity of the spherical radially outer surface 4a of the spherical roller 4 finished as a finished product was verified.

Figure 4A:
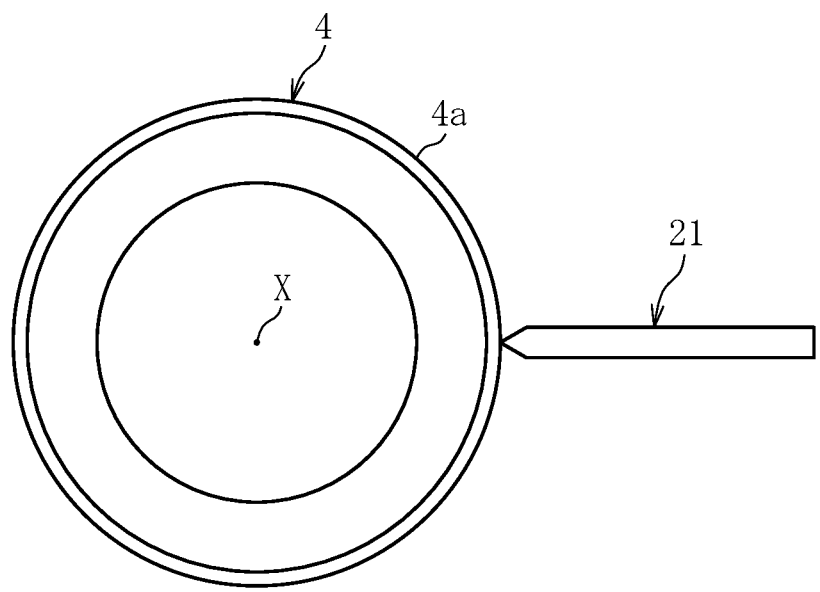
FIG. 4a is a schematic plan view for illustrating a state in which a circularity of the spherical radially outer surface of the roller is measured.
Figure 4B:
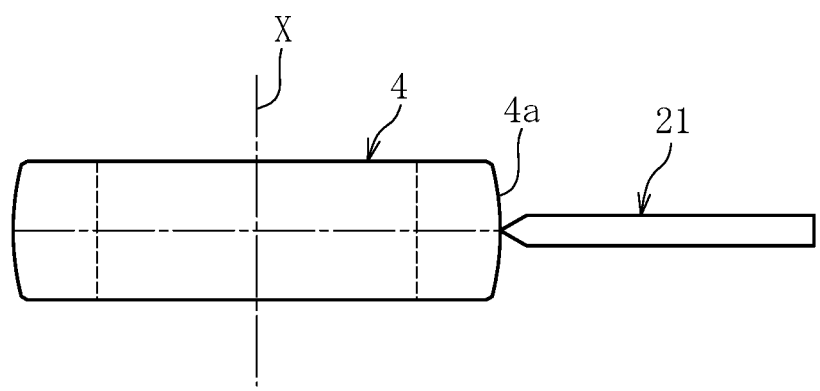
FIG. 4b is a schematic side view for illustrating the state in which the circularity of the spherical radially outer surface of the roller is measured.

A method of measuring the circularity of the spherical radially outer surface 4a of the spherical roller 4 adopted in this embodiment, and results of the measurement are described with reference to FIG. 4a, FIG. 4b, FIG. 5a, and FIG. 5b. FIG. 4a and FIG. 4b are illustrations of an overview of the method of measuring the circularity. FIG. 4a is a plan view, and FIG. 4b is a side view. A TALYROND 265 manufactured by Taylor Hobson Ltd was used as a circularity measuring device, and measurement was performed at a spindle rotation speed of 6 min$^{-1}$. As illustrated in FIG. 4b, measurement was performed under a state in which a measurement terminal 21 was held in abutment against a center of the spherical radially outer surface 4a of the spherical roller 4.

Figure 5A:
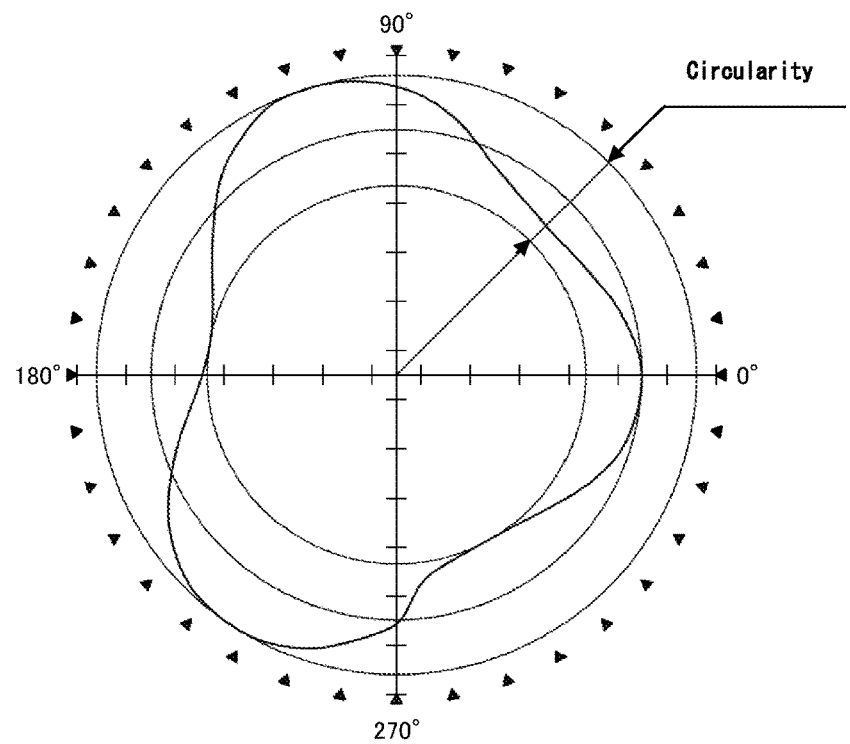
FIG. 5a is a view for illustrating a measurement result of a circularity measured by the method illustrated in FIG. 4a and FIG. 4b in a case of the roller deformed into a triangular shape due to the heat treatment.
Figure 5B:
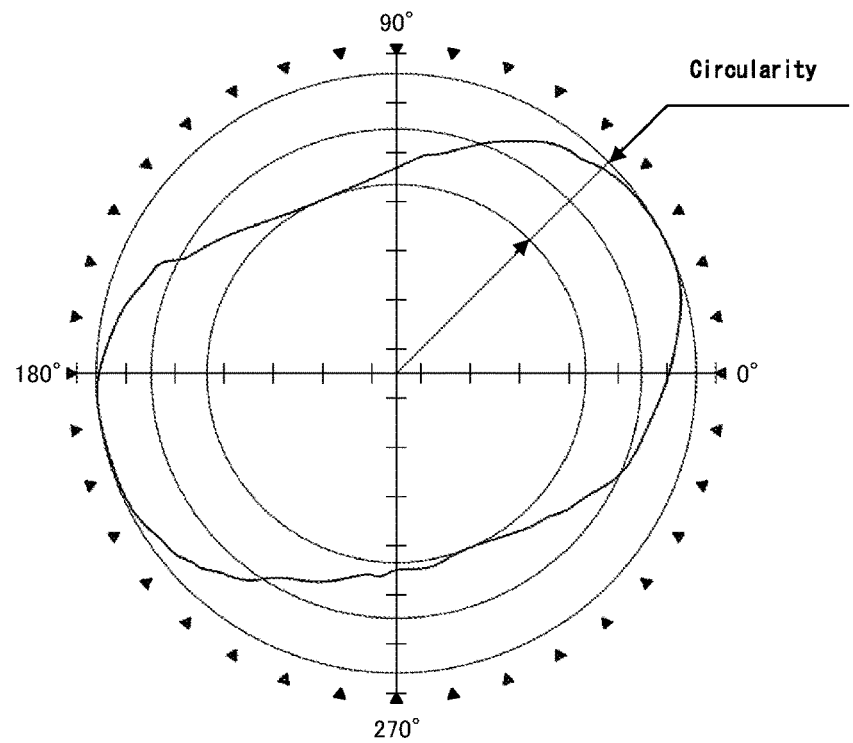
FIG. 5b is a view for illustrating a measurement result of a circularity measured by the method illustrated in FIG. 4a and FIG. 4b in a case of the roller deformed into an oval shape due to the heat treatment.

Representative examples of results of the above-mentioned measurement are illustrated in FIG. 5a and FIG. 5b. FIG. 5a is an illustration of an example of the roller deformed into a triangular shape due to the heat treatment, and FIG. 5b is an illustration of an example of the roller deformed into an oval shape having two convex portions due to the heat treatment. Both of the shapes have a circularity of 20 μm.

Example 1

The spherical roller 4 according to Example, which was unsubjected to grinding after subjecting to heat treatment, was incorporated into the tripod type constant velocity universal joint 1, and joint characteristics were evaluated. As Example, there were prepared spherical rollers 4 having various circularities, such as spherical rollers 4 having residual deformation due to the heat treatment and being formed into a triangular shape (see FIG. 5a), an oval shape (see FIG. 5b), and the like with various circularities within a range of from 10 μm to 30 μm. The related-art product was subjected to grinding to have a circularity of less than 5 μm.

[Characteristic Evaluation Tests]

In the following characteristic evaluation tests, tripod type constant velocity universal joints of an ETJ75 size classified by NTN Corporation were used as test samples.

<High-Load Endurance Test>

A bench test was performed as an accelerated evaluation test of a joint lifetime. A condition of torque to be applied was set to high-torque application condition suited for the joint size, and an operating angle was set to a maximum normal angle to be adopted in tripod type joints. Evaluation was performed under a condition where the sample number "n" was four, and all of the samples reached a target. Based on the results and variations in lifetime of existing products, it was judged that there was a high possibility that excellent lifetime was achieved.

<Induced Thrust Force Measurement>

(Test Conditions)

Torque: 300 Nm

Rotation number: 300 min$^{-1}$

Operating angle: 0° to 15°

It was determined by a bench test that the samples reached a level of causing no influence on vibration during acceleration of a vehicle. The performance which is substantially equivalent to that of existing products was obtained.

<Sliding Resistance under Static Vibration>

(Test Conditions)

Torque: 150 Nm

Amplitude: ±0.02 mm

It was determined by a bench test that the samples reached a level of causing no influence on idling vibration. The performance which is substantially equivalent to that of existing products was obtained.

Evaluation results are shown in Table 1. The evaluation results of joint characteristics in Table 1 are represented by the following marks. The same results were obtained in all of the above-mentioned various spherical rollers 4. Thus, a summary of the results is shown in Table 1.

⊚: excellent, ○: no problem in actual use

TABLE 1

| Characteristics | Example (10 μm to 30 μm) | Related-art product (Less than 5 μm) |
|---|---|---|
| Rolling | ○ | ⊚ |
| Sliding | ○ | ○ |
| Lubrication | ⊚ | ○ |
| Lifetime | ⊚ | ○ |

Based on the evaluation results shown in Table 1, it was determined that the tripod type constant velocity universal joint 1, having the spherical rollers 4 according to Example incorporated therein, had no problem in actual use in terms of a rolling characteristic and a sliding characteristic. Further, such an unexpected result was determined that the tripod type constant velocity universal joint 1 had a lubricating characteristic and a lifetime characteristic more excellent than those of the related-art product.

Figure 6A:
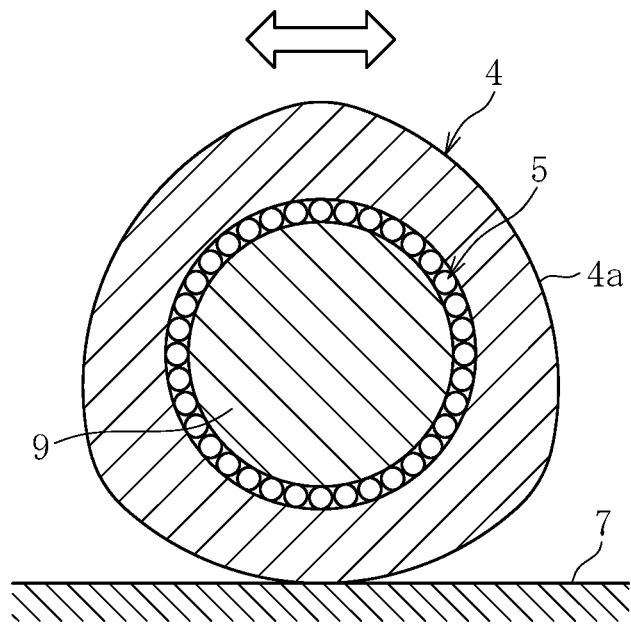
FIG. 6a is a schematic view for illustrating an operating state of the roller according to this embodiment.
Figure 6B:
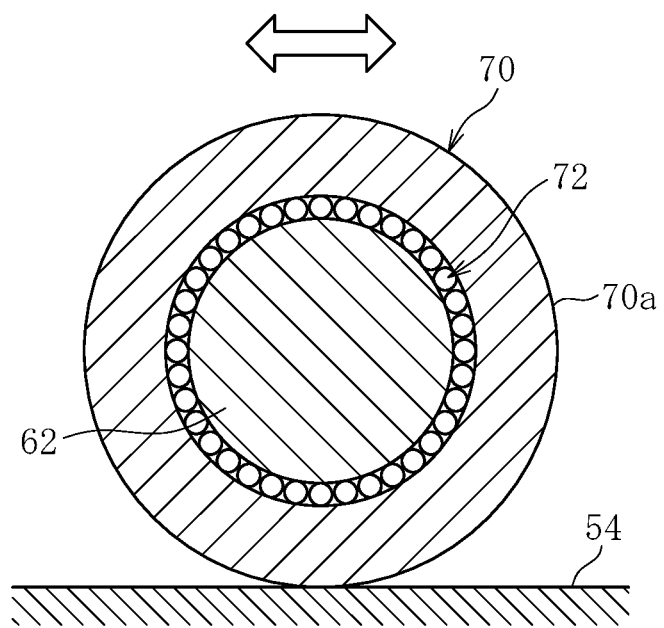
FIG. 6b is a schematic view for illustrating an operating state of a roller manufactured by a related-art processing method.
Figure 7A:
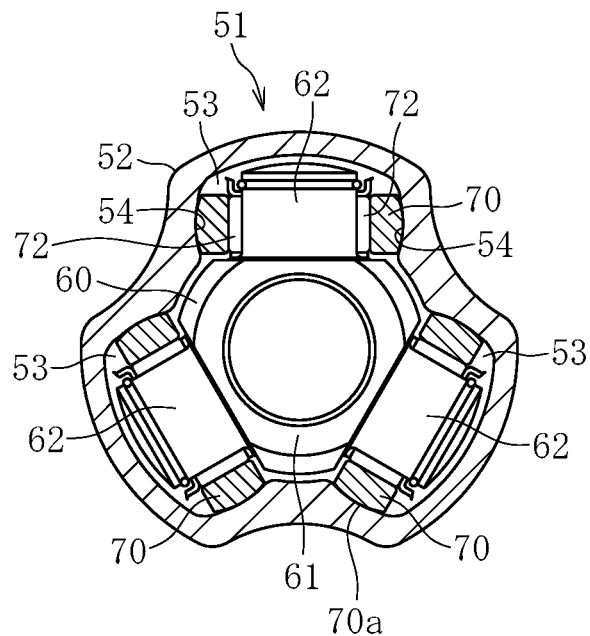
FIG. 7a is a lateral sectional view for illustrating a related-art tripod type constant velocity universal joint.
Figure 7B:
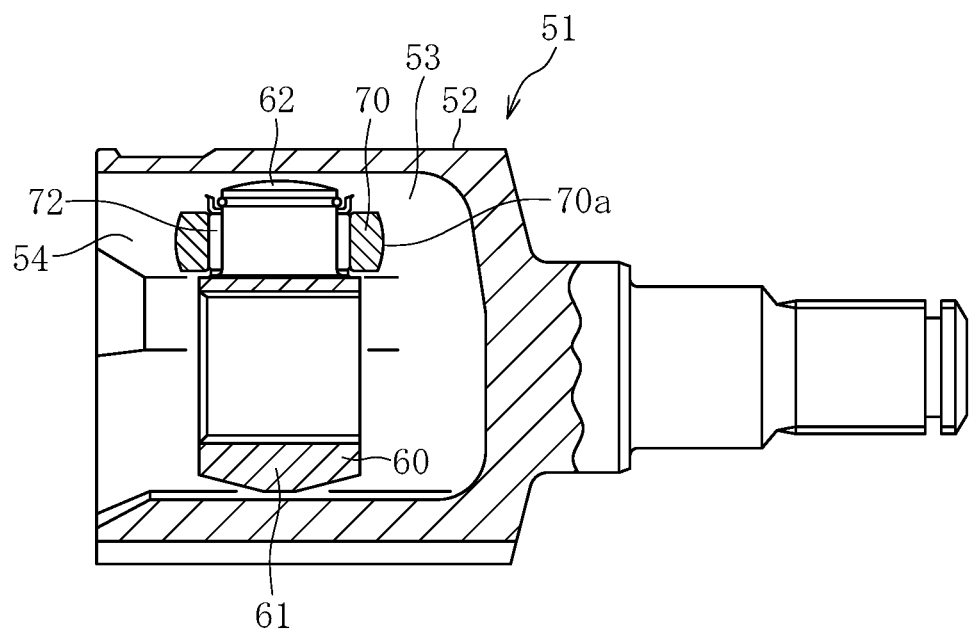
FIG. 7b is a longitudinal sectional view for illustrating the related-art tripod type constant velocity universal joint.

The reason why the above-mentioned evaluation results were obtained was studied. The reason is described with reference to FIG. 6a and FIG. 6b. FIG. 6a is a schematic view for illustrating an operating state of the spherical roller adopted in this embodiment, and FIG. 6b is a schematic view for illustrating an operating state of a spherical roller of the related-art product. In FIG. 6a, the spherical roller deformed by the heat treatment into a triangular shape is illustrated as an example, and the amount of deformation is illustrated in an exaggerated manner for ease of understanding.

(1) Circularity of Spherical Roller and Dispersion and Equalization of Contact Region A spherical radially outer surface 70a of a related-art spherical roller 70 having been subjected to grinding as illustrated in FIG. 6b has a circularity of 4 μm or less, and outer diameter fluctuations in phases are small. Accordingly, during oscillating movement indicated by the outlined arrow, the spherical roller 70 continuously bears load on a certain range of the spherical radially outer surface 70a. Thus, it is conceivable that damage is prone to progress, which is disadvantageous in terms of lifetime. Additional description is made of the above-mentioned oscillating movement. When the tripod type constant velocity universal joint is rotated while forming the operating angle θ, the tripod type constant velocity universal joint repeats, during each rotation, such swinging movement that each trunnion journal 62 swings from an inclined state illustrated in FIG. 8a to the opposite side. This movement is referred to as oscillating movement. The same holds true for this embodiment described below.

In contrast to the above-mentioned related-art product, the spherical radially outer surface 4a of the spherical roller 4 adopted in this embodiment, which is unsubjected to grinding after subjecting the heat treatment as illustrated in FIG. 6a, has a large circularity of from 10 μm to 30 μm, and there are outer diameter differences in phases. Due to the outer diameter differences in phases, in the spherical roller 4 according to this embodiment, there is difference in rolling resistance between the spherical roller 4 and the roller guide surfaces 7 in each phase, and movement is changed during the oscillating movement (indicated by the outlined arrow). Consequently, the spherical roller 4 is shifted little by little to move over an entire region of an outer periphery of the spherical radially outer surface 4a. Thus, it is conceivable that dispersion and equalization of a contact region is achieved, which is advantageous in terms of lifetime.

Further, when a direction of applying drive torque is switched, and the spherical roller 4 comes into contact with the opposite roller guide surface 7, in a case of the spherical roller 4 according to this embodiment, which is unsubjected to grinding after subjecting to the heat treatment, a shape of a portion of the roller coming into contact with the roller guide surface 7 is non-uniform and unstable. Accordingly, when the spherical roller 4 comes into contact with the opposite roller guide surface 7, the spherical roller 4 rotates easily, and moves over the entire region of the outer periphery of the spherical radially outer surface 4a. Thus, it is conceivable that dispersion and equalization of a contact region is achieved, which is advantageous in terms of lifetime.

(2) Circularity and Rolling Resistance of Spherical Roller

In addition, the spherical roller 4 according to this embodiment, which is unsubjected to grinding after subjecting to the heat treatment, has an outer periphery larger than that of the related-art roller 70 subjected to grinding. Accordingly, with the same sliding amount, a rotation angle of the spherical roller 4 according to this embodiment is smaller than that of the related-art roller. When the rotation angle is small, a rolling amount of the needle rollers 5 around each trunnion journal 9 is reduced, thereby reducing rolling resistance, which is conceivable to be advantageous in terms of lifetime.

(3) Turned Surface Having No Lead Mark

In addition, due to synergism of tumbling and a turned surface having no lead mark, the spherical roller 4 according to this embodiment can obtain the surface roughness equal to that of the related-art spherical roller 70 subjected to grinding. Thus, it is conceivable that abrasion resistance and durability can be maintained.

Based on the study and the evaluation results of Table 1 related to Example in which the roller has the circularity of from 10 μm to 30 μm, in consideration of slight influences on lubrication and lifetime, it has been concluded that there is no problem in actual use as long as an upper limit of the circularity is set to 40 μm. Reduction of the circularity to 10 μm or less, causes increase in cost for heat treatment, which is not preferred.

As described above, the characteristic configuration of the tripod type constant velocity universal joint according to this embodiment is that the spherical radially outer surface 4a of the spherical roller 4 is formed of a surface unsubjected to grinding or cutting work after subjecting to the heat treatment. Further, the characteristic configuration of the method of manufacturing the tripod type constant velocity universal joint according to the embodiment is that the method comprises the steps of manufacturing the rollers, which are performed without the step of grinding the spherical radially outer surface 4a of each spherical roller 4, and which comprise the step of turning the spherical roller through use of the formed turning tool and the step of tumbling the spherical roller. Thus, there can be achieved the tripod type constant velocity universal joint and the method of manufacturing the tripod type constant velocity universal joint, which are capable of reducing manufacturing cost and increasing productivity while maintaining the same function of the roller as that of the roller manufactured by the related-art processing method.

As the tripod type constant velocity universal joint according to this embodiment, there is exemplified a single roller type in which rollers are each fitted in a freely rotatable manner about a cylindrical outer peripheral surface of each of trunnion journals, which serve as leg shafts of a tripod member, through intermediation of a plurality of needle rollers, but the present invention is not limited thereto. The present invention is also applicable to a tripod type constant velocity universal joint of a double roller type in which a roller cassette comprising an inner ring, needle rollers, and a roller is fitted to each leg shaft of a tripod member.

The present invention is not limited to the above-mentioned embodiment. As a matter of course, the present invention may be carried out in various other embodiments without departing from the gist of the present invention. The scope of the present invention is defined in claims, and encompasses the meanings of equivalents described in claims and all changes within the scope of claims.

DESCRIPTION OF REFERENCE SIGNS

1 tripod type constant velocity universal joint
2 outer joint member
3 tripod member
4 spherical roller
4a spherical radially outer surface
5 needle roller
6 track groove
7 roller guide surface
8 trunnion barrel
9 trunnion journal
10 cylindrical outer peripheral surface
20 formed turning tool

The invention claimed is:

1. A tripod type constant velocity universal joint, comprising:
   an outer joint member having track grooves formed at trisected positions on the outer joint member in a circumferential direction of the tripod type constant velocity universal joint to extend in an axial direction thereof;
   a tripod member comprising leg shafts radially projecting from trisected positions on the tripod member in the circumferential direction; and
   rollers fitted in a freely rotatable manner about the leg shafts, respectively, and received in the track grooves, respectively,
   wherein a radially outer surface of each of the rollers is formed of a surface unsubjected to grinding or cutting work after subjecting to heat treatment, and
   wherein the radially outer surface of each of the rollers has a circularity of 10 μm or more and 40 μm or less.

2. The tripod type constant velocity universal joint according to claim 1, wherein, prior to subjecting to the heat treatment, the radially outer surface of each of the rollers is formed of a turned surface having no lead mark.

3. The tripod type constant velocity universal joint according to claim 1, wherein
   the leg shafts are trunnion journals, and
   each of the rollers is fitted in a freely rotatable manner about a cylindrical outer peripheral surface of one of the trunnion journals through intermediation of a plurality of needle rollers.

* * * * *